United States Patent [19]
Martinus Lenkens

[11] Patent Number: 6,030,031
[45] Date of Patent: Feb. 29, 2000

[54] VEHICLE COMPRISING AN OPEN ROOF CONSTRUCTION; AND AN OPEN ROOF CONSTRUCTION FOR A VEHICLE

[75] Inventor: Petrus Christiaan Martinus Lenkens, Beugen, Netherlands

[73] Assignee: Inalfa Industries B.V., Netherlands

[21] Appl. No.: 09/168,542

[22] Filed: Oct. 8, 1998

[30] Foreign Application Priority Data

Oct. 9, 1997 [NL] Netherlands .......................... 1007241

[51] Int. Cl.[7] ............................................. B60J 7/22
[52] U.S. Cl. ................................................ 296/217
[58] Field of Search ................................ 296/217, 180.1

[56] References Cited

U.S. PATENT DOCUMENTS 4,709,959 12/1987 Paerisch et al. ...................... 296/217
4,798,410 1/1989 Welier et al. ......................... 296/217

FOREIGN PATENT DOCUMENTS 419985 4/1991 European Pat. Off. ............... 296/217
43 21 915 7/1994 Germany .

Primary Examiner—Dennis H. Pedder
Attorney, Agent, or Firm—Westman, Champlin & Kelly, P.A.; S. Koehler

[57] ABSTRACT

A vehicle having an opening bounded by an edge in its fixed roof is provided with an open roof construction comprising at least one rigid panel, which is movable between a closed position, in which it closes the opening in the fixed roof, and a ventilating position, in which it slopes upwards to the rear. A downwardly extending sealing flap is formed on the side edges of said panel, which sealing flap forms a seal against the edge of the roof, which comprises a downwardly extending flange, in the ventilating position of the panel. The sealing flap comprises an outwardly projecting part near its lower side, which substantially abuts against the underside of the flange in the ventilating position of the panel.

10 Claims, 5 Drawing Sheets

VEHICLE COMPRISING AN OPEN ROOF CONSTRUCTION; AND AN OPEN ROOF CONSTRUCTION FOR A VEHICLE

BACKGROUND OF THE INVENTION

1. Field of the Invention

The present invention relates to a vehicle having an opening, bounded by an edge, in its fixed roof, which vehicle is provided with an open roof construction comprising at least one rigid panel, which is movable between a closed position, in which it closes the opening in the fixed roof, and a ventilating position, in which it slopes upwards to the rear, wherein a downwardly extending sealing flap is formed on the side edges of said panel, which sealing flap forms a seal against the edge of the roof, which comprises a downwardly extending flange, in the ventilating position of the panel.

2. Description of the Related Art

A vehicle of this kind is for example known from French patent application no. 2 573 369. The sealing flap on the panel of the open roof construction is pressed against the edge of the roof opening or against an intermediate seal with a certain bias, so as to maintain the sealing action.

SUMMARY OF THE INVENTION

The object of the present invention is to further improve the known vehicle comprising the open roof construction.

In order to accomplish that objective, the vehicle according to the invention is characterized in that said sealing flap comprises an outwardly projecting part near its lower side, which substantially abuts against the underside of the flange in the ventilating position of the panel.

Since the sealing between the sealing flap and the edge of the roof opening substantially takes place against the underside of the flange on the roof edge, there is no need for a lateral pressure of the sealing flap against the edge of the roof opening. As a result of this, the lateral tolerances are less critical. Furthermore, noises caused by the movement of the sealing flap along the roof edge can be eliminated to a large degree.

In case the panel can also be moved downwardly from the closed position for the purpose of making a sliding movement, it will be advantageous if the sealing flap is adjustable in vertical direction. This aspect makes it possible for the sealing flap to extend over a relatively large height in the ventilating position of the panel, whilst on the other hand the height of the sealing flap can be reduced upon downward movement of the panel, so that the overall height of the open roof construction need not be adversely influenced by the sealing flap.

Several possibilities exist for adjusting the height of the sealing flap. Thus, the sealing flap may possess an at least approximately horizontal bending line, in order to make it possible to fold or bend the sealing flap aside. The sealing flap may also have a harmonica-like cross-section, so that the sealing flap can be compressed in vertical direction. Furthermore it is conceivable for the sealing flap to comprise at least two vertically movable parts, whereby said parts slide past each other when the panel moves downwardly.

The invention furthermore comprises an open roof construction intended for use in the above-described vehicle.

The invention will be explained in more detail hereafter with reference to the drawings, which schematically show embodiments of the invention.

DESCRIPTION OF THE PREFERRED EMBODIMENT

Figure 1:
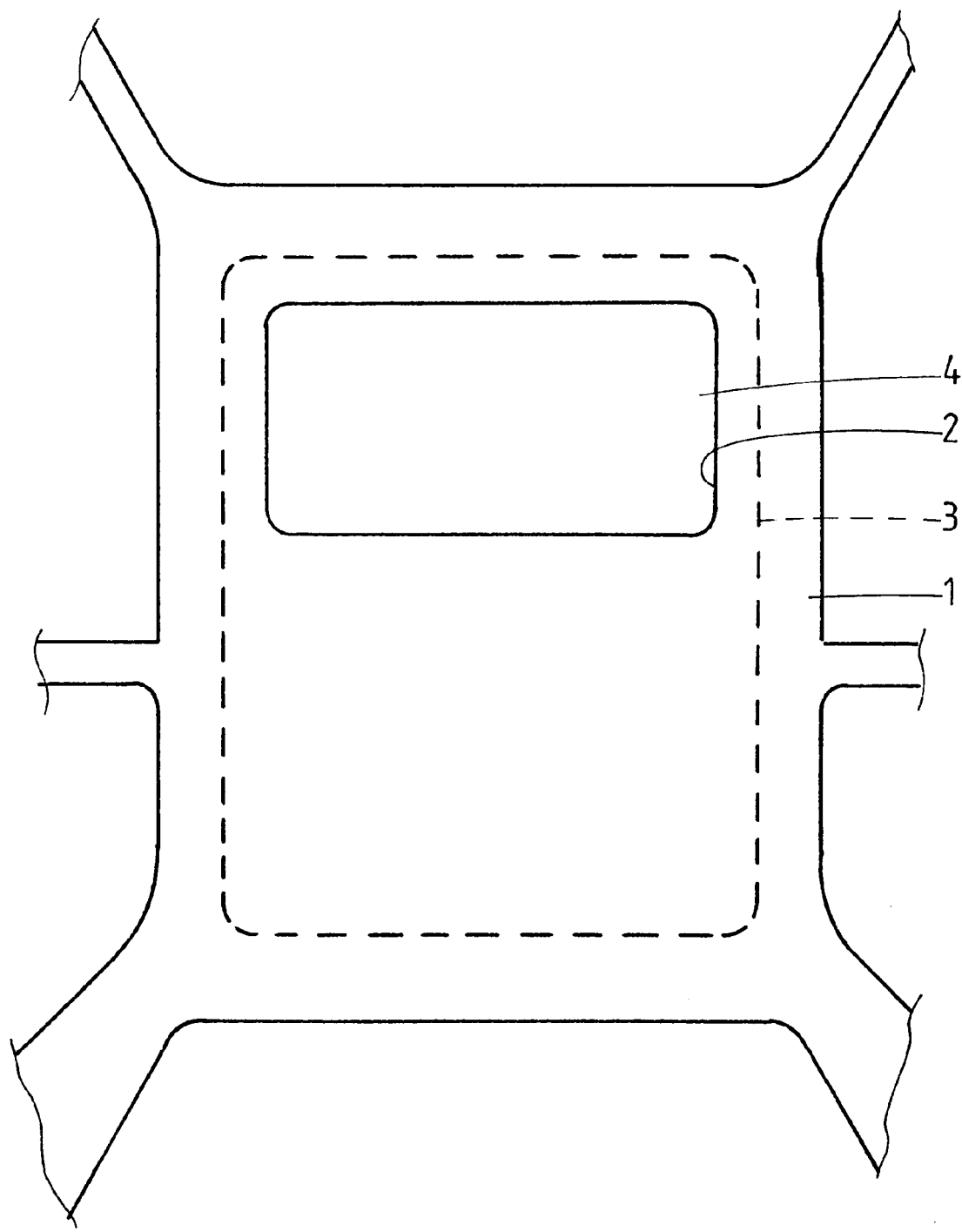
FIG. 1 is a very schematic plan view of a vehicle roof comprising an open roof construction according to the present invention.
Figure 2:
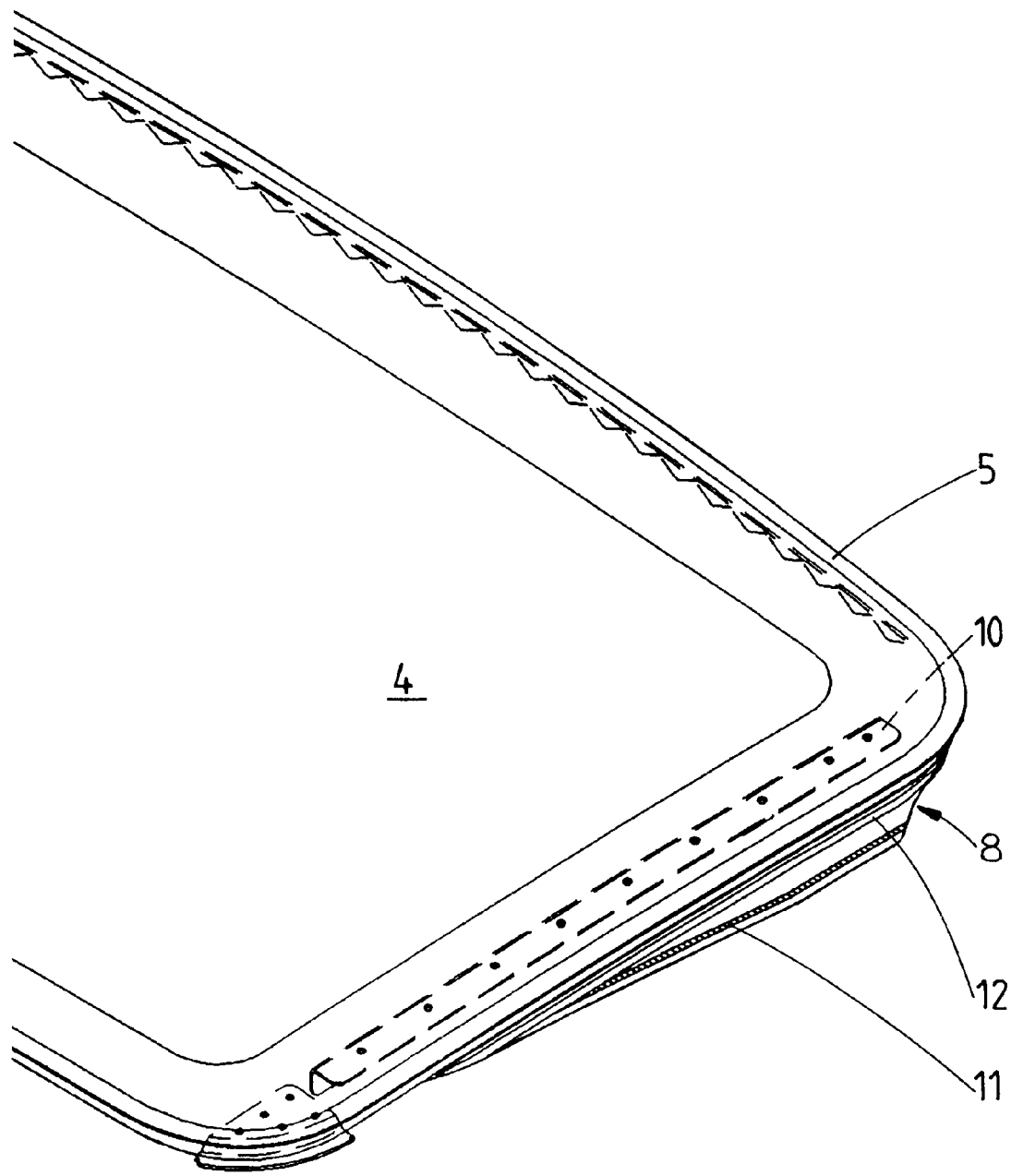
FIG. 2 is a larger-scale, perspective view of a panel of the open roof construction according to the invention.
Figure 3:
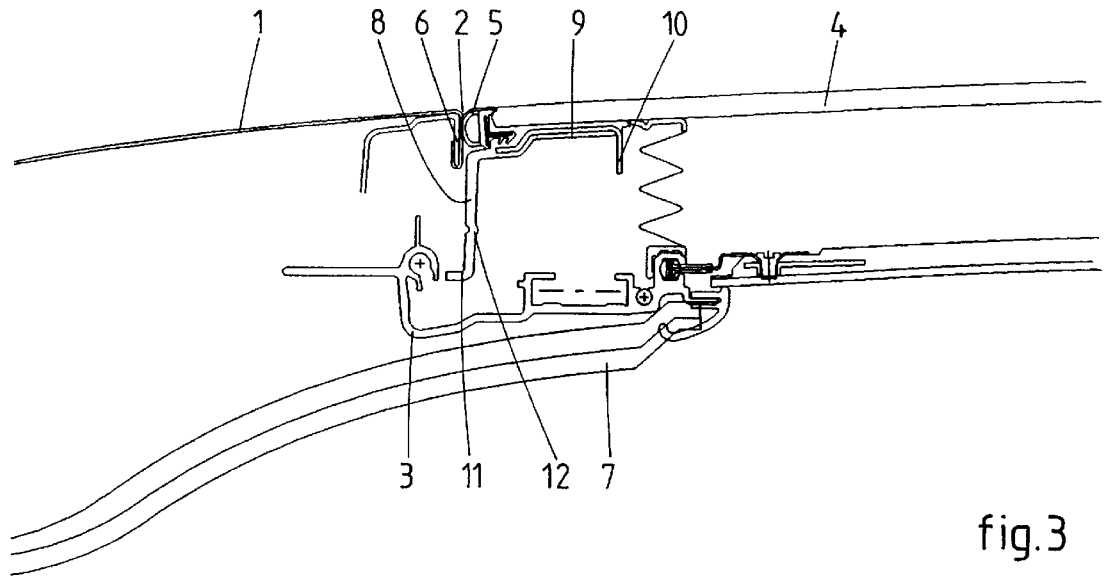
FIGS. 3, 4 and 5 are larger-scale, partially sectional views along line III—III in FIG. 1, wherein three different positions are shown.

The drawing, and in first instance FIG. 1, shows a fixed roof 1 of a vehicle, in particular a motor vehicle such as a passenger car, wherein a roof opening 2 is recessed in fixed roof 1 for the purpose of accommodating an open roof construction.

As is also shown in FIGS. 2–5, the open roof construction comprises a panel 4 which is movably supported, in a manner which is not shown, by a frame 3 or similar stationary part, which panel is a transparent glass panel in this embodiment, but which may also have different forms. Panel 4 is positioned within roof opening 2 in its closed position, in which position it forms a seal by means of a sealing section 5. Sealing section 5 is formed on the circumferential edge of panel 4 in this embodiment, and abuts against the surface of a downwardly extending flange 6 of fixed roof 1 in the closed position. Said flange 6 defines the edge of roof opening 2.

Figure 4:
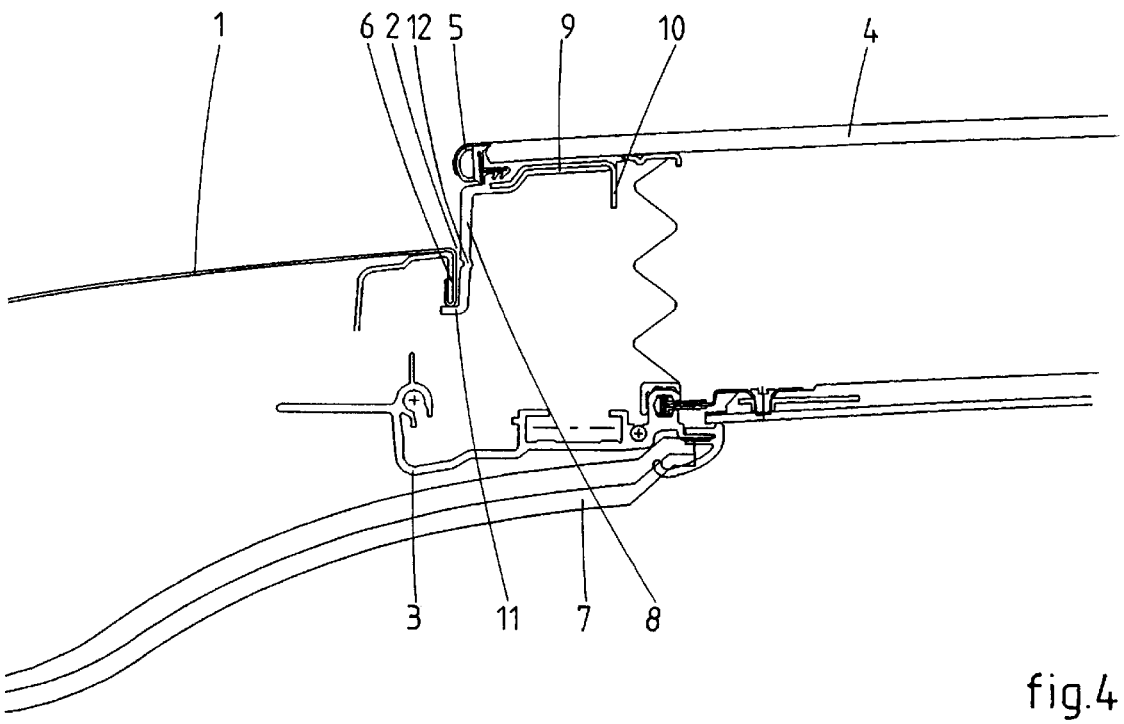
Figure 5:
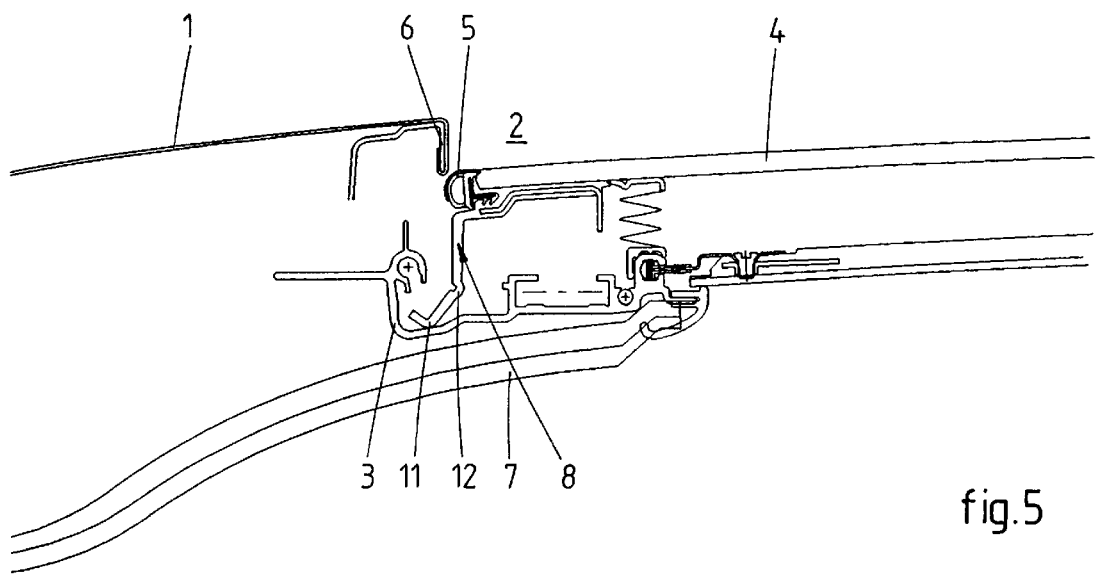

From its closed position in roof opening 2 (FIG. 3), panel 4 can move at least in upward direction to a ventilating position, in which position panel 4 slopes upwards to the rear (FIG. 4). To this end, panel 4 pivots about a pivot pin which is disposed near the front edge of panel 4. Of course the panel could also be moved upwards in a different manner. As FIG. 5 shows, panel 4 is also capable of downward movement in this embodiment, so as to effect a sliding movement of the panel, for example a sliding movement in rearward direction, wherein panel 4 is received between the fixed roof 1 and the roof upholstery 7 of the vehicle (FIG. 5).

FIGS. 2–5 furthermore show that a sealing flap 8 is formed on the side edges of panel 4, which sealing flap extends substantially downwardly from the side edge of panel 4. Said sealing flap 8, which extends at least over a large part of the side edges, functions to prevent wind noise and to prevent the wind blowing into the vehicle when the vehicle is driving with the panel in the ventilating position. When panel 4 is moved to the ventilating position, the presence of the sealing flaps 8 ensures that essentially a ventilation opening is only formed at the rear side of panel 4. Sealing flap 8 may be an integral part of a circumferential, injection-moulded plastic strip 9 on the edge of the panel by injection moulding, which is intended for fixing stiffening sections 10 to the panel and fixing sealing section 5 to the edges of panel 4. Sealing flap 8 may also be a separate part, of course. Sealing flap 8 is preferably made of a flexible plastic material, such as PU, but also other materials are conceivable. The sealing flap may also be made, at least partially so, of a rigid material.

Sealing flap 8 is preferably positioned such that a gap of for example 1–3 mm will remain between the outside of sealing flap 8 and flange 6. The sealing between sealing flap 8 and the edge of roof opening 2 and flange 6 respectively substantially takes place by an outwardly projecting lower part 11, which is for example hook-shaped, of sealing flap 8, which is capable of engaging the lower edge of vertical flange 6 in the upper ventilating position of the panel, so as to form a reliable seal therebetween.

The height of sealing flap 8, which will generally vary in length, is largely determined by the upward movement of panel 4 from the closed position to the ventilating position. In those cases where it must be possible to move the panel downwards as well, as in the illustrated embodiment, the presence of the sealing flap might present problems if a small overall height of the open roof construction is aimed at, since the lower edge of sealing flap 8 may come into contact with an underlying frame portion in that case. In order to be sure that sealing flap 8 will not cause any problems, not even in the case of a small overall height, the sealing flap is constructed in such a manner that it is capable of adjusting its height when panel 4 is being moved downwardly. In the example shown in FIGS. 3–5, this has been realised by providing an at least approximately horizontal bending line 12, at which the web of sealing flap 8 is weakened and the part of sealing flap 8 below bending line 12 can move out laterally if the lower edge of sealing flap 8 comes into contact with the frame. In this manner it is possible to move the panel far downwards without sealing flap 8 being in the way (see FIG. 5).

Figure 6:
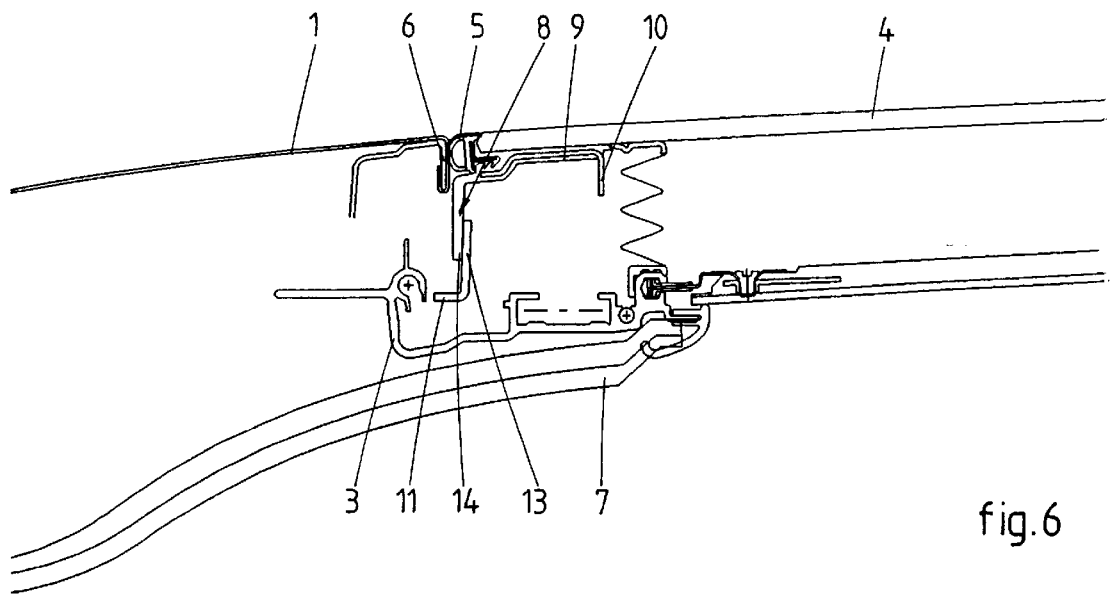
FIGS. 6 and 7 are sectional views corresponding with FIG. 3 of two alternative embodiments of the invention.
Figure 7:
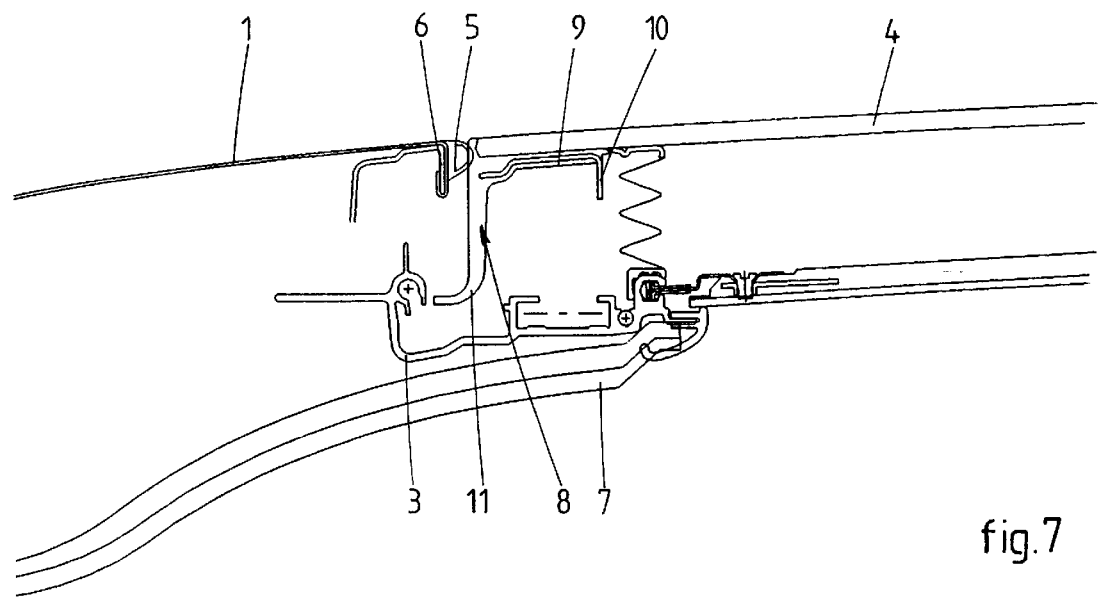

FIGS. 6 and 7 show two alternative embodiments of a sealing flap 8, wherein the sealing flap in the embodiment of FIG. 6 consists of two parts 13 and 14 which can slide past one another in vertical direction, whilst the sealing flap of FIG. 7 comprises a harmonica section 15 so as to make it possible to compress sealing flap 8 in vertical direction. Said harmonica must spring back to the extended position each time, so as to avoid coming into contact with flange 6 of the roof edge.

Figure 8:
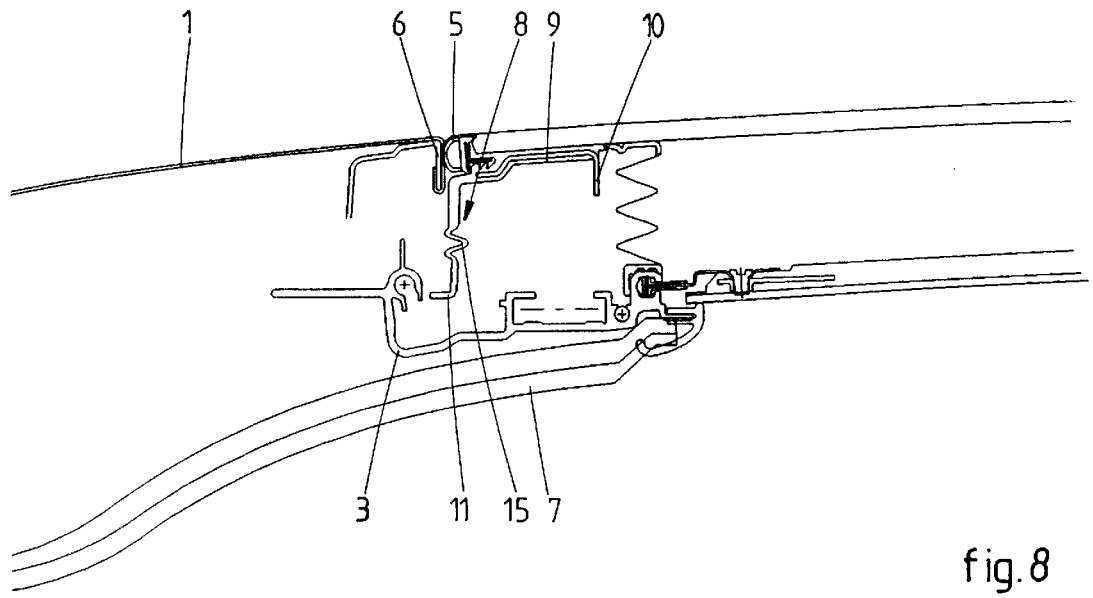
FIG. 8 is a sectional view corresponding with FIG. 3 of another alternative embodiment of the invention.

FIG. 8 shows yet another alternative embodiment of the open roof construction according to the invention, wherein sealing section 5 is not formed on the edge of panel 4, but on the edge of roof opening 2 or flange 6 of fixed roof 1. Also in this case a hook-shape lower part 11, which may be flexible, may be formed on sealing flap 8 so as to come into sealing contact with the lower edge of flange 6.

The invention is not limited to the above-described embodiment as shown in the drawing, which can be varied in several ways within the scope of the invention. Thus, flange 6 may also consist of a vertical surface formed on the opening edge of the fixed roof.

I claim:

1. A vehicle having an opening (2) in its fixed roof (1), said opening being bounded by an edge which comprises a downwardly extending flange (6), said vehicle is provided with an open roof construction comprising:

at least one rigid panel (4), which is movable between a closed position, in which it closes the opening in the fixed roof, and a ventilating position, in which it slopes upwards to the rear, wherein a downwardly extending sealing flap (8) is formed on side edges of said panel (4), said sealing flap (8) comprising an outwardly projecting part (11) near its lower side, which substantially abuts against the underside of the flange (6) in the ventilating position of the panel (4) in order to form a seal against the edge of the roof.

2. A vehicle according to claim 1, wherein the outwardly projecting part (11) of the sealing flap is hook-shaped.

3. A vehicle according to claim 1, wherein the panel (4) can also be moved downwards from the closed position for the purpose of making a sliding movement, and wherein the sealing flap (8) is vertically adjustable.

4. A vehicle according to claim 3, wherein the sealing flap (8) possesses an at least approximately horizontal bending line (12).

5. A vehicle according to claim 3, wherein at least the lower part (11) of the sealing flap (8) is flexible.

6. A vehicle according to claim 3, wherein the sealing flap comprises a harmonica-like cross-section (15), at least partially so.

7. A vehicle according to claim 3, wherein the sealing flap (8) comprises at least two vertically movable parts (13, 14).

8. A vehicle according to claim 1, wherein the panel (4) is provided with a circumferential, injection-molded plastic strip (9), and wherein the sealing flap (8) is integrated in said plastic strip.

9. A vehicle according to claim 1, wherein a sealing section (5) is provided between the edge of the panel (4) and the edge of the roof opening (2) for the purpose of providing a seal in the closed position.

10. An open roof construction for use in a vehicle having an opening (2) in its fixed roof (1), said opening being bounded by an edge which comprises a downwardly extending flange (6), said open roof construction comprising at least one rigid panel (4), which is movable between a closed position, in which it closes the opening in the fixed roof, and a ventilating position, in which it slopes upwards to the rear, wherein a downwardly extending sealing flap (8) is formed on the side edges of said panel (4), said sealing flap (8) comprising an outwardly projecting part (11) near its lower side, which is capable of substantially abutting against the underside of the flange (6) in the ventilating position of the panel (4) in order to form a seal against the edge of the fixed roof.

* * * * *